(12) United States Patent
Triulzi et al.

(10) Patent No.: US 7,544,752 B2
(45) Date of Patent: Jun. 9, 2009

(54) TFE-BASED THERMOPROCESSABLE COPOLYMERS

(75) Inventors: Francesco Triulzi, Milan (IT); Marco Apostolo, Novara (IT); Vito Tortelli, Milan (IT); Marco Galimberti, Milan (IT)

(73) Assignee: Solvay Solexis S.p.A., Milan (IT)

( * ) Notice: Subject to any disclaimer, the term of this patent is extended or adjusted under 35 U.S.C. 154(b) by 315 days.

(21) Appl. No.: 11/191,031

(22) Filed: Jul. 28, 2005

(65) Prior Publication Data

US 2006/0025635 A1 Feb. 2, 2006

(30) Foreign Application Priority Data

Jul. 30, 2004 (IT) .......................... MI2004A1572

(51) Int. Cl.
*C08F 116/12* (2006.01)
*C07C 43/17* (2006.01)

(52) U.S. Cl. ...................... 526/247; 568/674

(58) Field of Classification Search ....................... None
See application file for complete search history.

(56) References Cited

U.S. PATENT DOCUMENTS

| 2,946,763 | A | | 7/1960 | Bro et al. |
| 3,635,926 | A | | 1/1972 | Gresham et al. |
| 4,400,872 | A | | 8/1983 | Berges |
| 4,743,658 | A | | 5/1988 | Imbalzano et al. |
| 7,148,300 | B2 | * | 12/2006 | Fukushi et al. .............. 526/247 |
| 2003/0092860 | A1 | * | 5/2003 | Wu et al. .................... 526/250 |

FOREIGN PATENT DOCUMENTS

| EP | 1 148 072 A2 | 10/2001 |
| EP | 1 148 072 A3 | 10/2001 |
| EP | 1 172 380 A2 | 1/2002 |
| EP | 1 172 380 A3 | 1/2002 |
| EP | 1 260 550 A1 | 11/2002 |
| EP | 1 308 467 A2 | 5/2003 |
| EP | 1 308 467 A3 | 5/2003 |
| EP | 1 323 750 A2 | 7/2003 |
| GB | 1 514 700 | 6/1978 |
| JP | 219579 | 8/2004 |
| JP | 2004219579 | 8/2004 |

OTHER PUBLICATIONS

Shu et al., machine translation of JP 2004-163927, published Oct. 6, 2004.*
Partial European Search Report, Nov. 11, 2005.
Pianca et al., "End group in fluoropolymers", J. Fluorine Chem. 95, 71-84, 1999.
European Search Report, Apr. 12, 2006.

* cited by examiner

*Primary Examiner*—Rosalynd Keys
(74) *Attorney, Agent, or Firm*—Arent Fox LLP

(57) ABSTRACT

TFE-based thermoprocessable copolymers having the following composition, expressed in percentage by moles on the total of the monomers:

A) from 0.01 to 15% of the monomer of formula:

$$CF_2{=}CFOCF_2OCF_3 \qquad (a);$$

A1) tetrafluoroethylene from 99.99 to 85%; optionally
B) one or more (per)fluorinated comonomers having at least one unsaturation of ethylene type, different from TFE;
the sum of the molar percentages A)+B) being such as to give polymers showing at least one melting peak at the thermogravimetric analysis (DSC).

15 Claims, No Drawings

TFE-BASED THERMOPROCESSABLE COPOLYMERS

The present invention relates to tetrafluoroethylene (TFE)-based thermoprocessable copolymers having a low release of $F^-$ ions combined with improved mechanical and elastomeric properties at high temperature, for example from >200° C. up to 275° C.

Said thermoprocessable copolymers are used for preparing manufactured articles used in the semicon industry, in the preparation of fittings and tanks used for the storage and the transport of chemicals and of ultrapure water.

TFE-based thermoprocessable copolymers containing one or more comonomers are known. In U.S. Pat. No. 2,946,763 a TFE thermoprocessable copolymer is described, wherein the comonomer is hexafluoropropene (HFP). According to this patent the necessary HFP amount to make the copolymer processable according to the usual processing techniques (extrusion, molding, injection, etc.) is of the order of 7-11% by moles, referred to the total of the monomers. This implies the drawback that the crystalline second melting temperature (Tm2, ASTM D 3418) is remarkably reduced and therefore also the maximum utilization temperature is reduced; according to the mentioned patent it is about 200° C. To overcome these inconveniences, in U.S. Pat. No. 3,635,926 a perfluoroalkylvinylether (in particular perfluoropropylvinylether, PPVE) is used as TFE comonomer. The PPVE amount necessary to make the copolymer processable, expressed in percent by moles on the total of the monomers, is about 2-3%, and therefore the TFE comonomer amount is very reduced with respect to that used when the comonomer is HFP, as mentioned above for U.S. Pat. No. 2,946,763. With said PPVE amount the Tm2 is higher and therefore also the maximum utilization temperature of the thermoprocessable copolymer is higher than that of the copolymer of U.S. Pat. No. 2,946,763. It is known that the TFE/PPVE copolymers show the drawback to contain —COF end groups, which generate $F^-$ ions by decomposition. The presence of said ions should be reduced since they corrode the semicon plants and damage the silicon-based wafers. Besides the PPVE is known to be a poor reactive comonomer, whereby at the end of the polymerization with TFE it is necessary to recover the unreacted monomer. The monomer recovery implies a greater complexity of the production plant of the TFE/PPVE copolymers and represents an additional cost from an industrial point of view. See GB 1,514,700.

To obviate the inconvenience of the —COF end groups present in the TFE/PPVE copolymers, various post-treatment methods have been developed in order to stabilize said end groups. For example U.S. Pat. No. 4,743,658 describes a process for the stabilization of the TFE/PPVE copolymer end groups by fluorination with elemental fluorine. Said stabilization processes are complicated and expensive and from an industrial point of view are disadvantageous.

The need was felt to have available TFE-based thermoprocessable copolymers, having a low $F^-$ release combined with improved mechanical and elastomeric properties at high temperature, for example from >200° C. up to 275° C.

The Applicant has surprisingly and unexpectedly found TFE thermoprocessable copolymers solving said technical problem.

It is an object of the present invention TFE-based thermoprocessable copolymers having the following composition, in % by moles on the total of the monomers:

A) from 0.01 to 15%, preferably from 0.05 to 13%, still more preferably from 0.1 to 9% of the monomer of formula:

$$CF_2\!\!=\!\!CFOCF_2OCF_3 \qquad (a);$$

A1) tetrafluoroethylene from 99.99 to 85%, preferably from 99.95 to 87%, still more preferably from 99.9 to 91%;

optionally

B) one or more (per)fluorinated comonomers having at least one unsaturation of ethylene type, different from TFE;

when B) is present the sum of the molar percentages of A1)+B) is within the limits above mentioned for A1), and the sum of the molar percentages A)+B) being such to give polymers showing at least one melting peak at the thermogravimetric analysis (DSC) (differential scanning calorimetry).

Generally the sum of A)+B), is equal to or lower than 14% by moles, preferably equal to or lower than 10%.

The copolymers of the present invention show the following combination of properties:

content of —COF end groups: lower than the method sensitivy limit as indicated hereinafter;
reduced release of $F^-$ ions from pellets;
good mechanical properties typical of thermoprocessable polymers and good flex life.

The content of the —COF end groups is determined by the following method.

At the end of the polymerization, the polymer is isolated by coagulation with nitric acid; it is washed twice with demineralizd water and is dried in a stove at 220° C. until a constant weight (about 6 hours) obtaining a powder.

The —COF end groups are determined by FT-IR spectroscopy; on a polymer powder pellet sintered at 25° C., having a diameter of 5 mm and a thickness from 50 to 300 micron (1.75-10.5 mg of polymer) a scanning between 4,000 cm$^{-1}$ and 400 cm$^{-1}$ is carried out. The pellet is then kept for 12 hours in an environment saturated with ammonia vapours; lastly the IR spectrum is recorded under the same conditions of the initial IR spectrum and the two spectra are elaborated by subtracting to the signals of the spectrum related to the untreated specimen (initial spectrum) the corresponding signals of the specimen spectrum after exposure to ammonia vapours, drawing the "difference" spectrum, normalized by the following equation:

$$\frac{\text{``Difference spectrum''}}{[\text{pellet weight (g)/pellet area (cm}^2)]};$$

the optical densities related to the end groups, reacted with the ammonia vapours, are measured; they with this reactant give detectable peaks of the —COF end groups; the optical densities are converted into mmoles/kg of polymer by using the extinction coefficients reported in Table 1, page 73 of the report by M. Pianca et Al. "End groups in fluoropolymers", J. Fluorine Chem. 95 (1999), 71-84 (herein incorporated by reference); the found values express the concentrations of the residual polar end groups as mmoles of polar end groups/Kg of polymer: in the spectrum of the thermoprocessable (per)fluorinated polymers no bands related to —COF groups (1900-1830 cm$^{-1}$) are detectable. The sensitivity limit of the above method is 0.05 mmoles/Kg.

The determination by IR spectroscopy is for example carried out by the Nicolet® Nexus FT-IR equipment (256 scannings, resolution 2 cm$^{-1}$).

Preferably comonomers B) are selected from the following:

$C_3$-$C_8$ perfluoroolefins, for example hexafluoropropene;
(per)fluoroalkylvinylethers of formula $CF_2\!\!=\!\!CFOR_f$, wherein $R_f$ is a $C_1$-$C_2$ (per)fluoroalkyl, preferably $Rf\!\!=\!\!CF_3$.

HFP and/or perfluoromethylvinylether are preferred comonomers. As said, the TFE thermoprocessable comonomers of the invention have a —COF end group content not detectable with the above method.

Therefore the thermoprocessable copolymers of the present invention, differently from the TFE thermoprocessable copolymers of the prior art, do not require post-treatments for the —COF end group stabilization.

Furthermore it has been found by the Applicant that the TFE thermoprocessable copolymers according to the present invention can be obtained with a high productivity. Thus, at the end of the polymerization, the further step of the unreacted monomers recovery is not carried out. This represent a further advantage from the industrial point of view.

A further object of the present invention are compositions comprising:
perfluoropolymers of the present invention and
perfluoropolymers obtainable from polymers containing an amount of —COF end group higher than 0.05 mmoles/Kg of polymer determined with the above described method; provided that the perfluoropolymer amount of the present invention is at least 5-10% by weight, preferably 20-40% by weight, more preferably 50% by weight, with respect to the total weight of the perfluoropolymers in the composition.

These compositions can be obtained in various ways. For example, when monomers giving —COF end groups are used in polymerization to obtain the improved properties according to the present invention, it is carried out a part of polymerization of monomers in the absence of those giving —COF end groups, so as to obtain a polymer aliquot substantially —COF end group free which allows to obtain the combination of the above mentioned properties. For example the polymer obtained in the polymerization part carried out in the absence of monomers giving —COF end groups must be at least 5-10% by weight, preferably 20-40% by weight, more preferably 50% by weight, with respect to the final polymer weight. An alternative process is that to mix the polymers of the present invention substantially —COF end group free with polymers containing —COF in the above ratios.

The perfluoropolymers with —COF end groups in an amount higher than 0.05 mmoles/Kg of polymer comprise comonomers selected from the following:
perfluorodioxoles, preferably having the following formula:

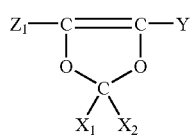

(2)

wherein
Y=F, ORf$_1$, Rf$_1$ being a C$_1$-C$_5$ perfluoroalkyl, preferably Rf$_1$ is CF$_3$;
X$_1$ and X$_2$, equal to or different from each other, are selected between F and CF$_3$, preferably F;
Z$_1$ is selected between F, Cl, preferably F;
perfluoroalkylvinylethers of formula CF$_2$=CFORf wherein Rf is a C$_3$ perfluoroalkyl;
CF$_2$=CFOXa perfluorooxyalkylvinylethers, wherein Xa is C$_3$-C$_{12}$ perfluorooxyalkyl having one or more ether groups, for example perfluoro-2-propoxy-propyl;
perfluorovinylethers (MOVE) of general formula CFX$_{AI}$=CX$_{AI}$OCF$_2$OR$_{AI}$ (A-I) wherein R$_{AI}$ is a C$_2$-C$_6$ linear, branched or C$_5$-C$_6$ cyclic perfluoroalkyl group, or a C$_2$-C$_6$ linear or branched when possible perfluorooxyalkyl group containing from one to three oxygen atoms; X$_{AI}$=F; the compounds of general formula: CFX$_{AI}$=CX$_{AI}$OCF$_2$OCF$_2$CF$_2$Y$_{AI}$ (A-II) wherein Y$_{AI}$=F, OCF$_3$ are preferred; in particular (MOVE 1) CF$_2$=CFOCF$_2$OCF$_2$CF$_3$ (A-III) and (MOVE 2) CF$_2$=CFOCF$_2$OCF$_2$CF$_2$OCF$_3$ (A-IV).

As said, the Applicant has found that the thermoprocessable perfluoropolymers of the present invention are obtained with high polymerization kinetics, therefore it is possible to obtain copolymers having a high molecular weight, as shown from the lower Melt Flow Index values. The thermoprocessable perfluoropolymers of the present invention are obtainable with high yields and therefore make useless, at the end of the polymerization, the recovery of the unreacted monomers. This allows to simplify the production plant, the expensive recovery methods of unreacted monomers not being necessary.

The monomer of formula (a) CF$_3$OCF$_2$OCF=CF$_2$ used in the polymers of the present invention can be prepared by a synthesis comprising the following steps:
I obtainment of the fluoroformate CF$_3$OCOF;
II reaction in liquid phase of the fluoroformate CF$_3$OCOF with elemental fluorine and olefinic compounds having formula:

for obtaining the fluorohalogenether of formula:

wherein A and A', equal to or different the one from the other, are H, Cl or Br, with the proviso that both are not H; the fluorination reaction temperature can range from −120° C. to −20° C., preferably from −100° C. to −40° C.; optionally one operates in the presence of a perhalogenated solvent, liquid and inert under the reaction conditions; the fluorine can optionally be diluted with an inert gas, e.g. nitrogen or helium;
III removal of the substituents A and A' from the fluorohalogenether (V) by a dehalogenation when A and A' are halogen, or a dehydrohalogenation when one of A or A' is hydrogen and the other is halogen;

the fluoroformate CF$_3$OCOF of step I can be prepared with high conversion and selectivity by thermal reaction, in gaseous phase, of CF$_3$OF (fluoroxyperfluoromethane) with CO, in a reactor maintained at temperatures in the range 80° C.-250° C., preferably 120° C.-230° C., still more preferably 150° C.-200° C.

The dehalogenation or dehydrohalogenation reactions used are well known in the prior art.

The molar ratio CF$_3$OF/CO is between 0.1 and 10, preferably between 0.2 and 5, more preferably between 0.5 and 2.

The perhalogenated solvent optionally used in step II, is preferably an organic compound containing fluorine and/or chlorine, optionally one or more oxygen atoms in the chain and/or aminic groups as end group.

When the perhalogenated solvent is perfluorinated, it can for example be selected among perfluorocarbons, perfluoroethers, perfluoropolyethers, perfluoroamines, or respective mixtures.

The reaction mixture containing CF$_3$OCOF of step I can be directly fed, without separation of the mixture components, into the other reactor for the reaction of step II. The process for obtaining the monomer of step I starting from $CF_3OF$ resulted particularly simple and effective. As said, the $CF_3OF$ conversion and the selectivity to $CF_3OCOF$ are high (see the Examples).

In step I, by increasing the reaction temperature in the range 80°-250° C., the conversion increases and, at the same time, a high selectivity is substantially maintained.

Alternatively, the $CF_3OCOF$ of step I can be prepared by photochemical route, in liquid phase, by feeding the two reactants as indicated above into a reactor equipped with a mercury high pressure UV lamp, contained in a cooled quartz sheath, immersed in the reaction mixture at temperatures comprised between 0° C. and 100° C., preferably between 20° C. and 50° C.

It has been found that the formation reaction of the fluoroformate by photochemical route has a high selectivity, and that higher yields are obtained compared with the same reaction carried out in gaseous phase.

The reaction by photochemical way is carried out in the presence of an inert perfluorinated solvent, liquid under the reaction conditions.

Preferably the perfluorinated solvent is selected from perfluorocarbons, perfluoropolyethers, perfluorinated tertiary amines, fluorochlorocarbons, or mixtures thereof.

When the $CF_3OF$ conversion is not quantitative, the gaseous flow leaving the reactor contains a mixture formed of the reaction product together with unconverted CO and $CF_3OF$. The latter can be removed by passing the gaseous flow into a cold trap containing a fluorinated olefin, for example CFCl=CFCl; then by fractional distillation $CF_3OCOF$ is separated.

Alternatively the gaseous reaction mixture containing the reaction products formed in step I is cooled to condensate the fluoroformate, separating $CF_3OF$ and CO which can be recycled into the reactor.

Preferably step I is carried out by reacting the fluorooxyperfluoromethane and carbon monoxide at temperatures from 80° C. to 250° C.

Preferably the reactor used in step I is made of glass, inert perfluorinated plastics, as for example PTFE, PFA, metal alloys, for example AISI 316, preferably coated with glass or perlfuorinated plastics. More preferably, as materials, glass or fluorinated plastics are used.

With the invention perfluoropolymers manufactured articles can be obtained usable up to temperatures of 275° C., having improved mechanical and elastomeric properties.

The following Examples illustrate with non limitative purposes the present invention.

EXAMPLES

Analytical Methods

Determination of the Melt Flow Index MFI

The determination is carried out according to the ASTM D 1238-52T method.

Determination of the —COF Polar End Groups

At the end of the polymerization, the polymer is isolated by coagulation with nitric acid; it is washed twice with demineralized water and it is dried in a stove at 220° C. until a constant weight (about 6 hours) obtaining a powder; the —COF end groups are determined by FT-IR spectroscopy, by using the Nicolet® Nexus FT-IR equipment (256 scannings, resolution 2 cm$^{-1}$); on a polymer powder pellet sintered at 25° C., having a diameter of 5 mm and a thickness from 50 to 300 micron (1.75-10.5 mg of polymer) a scanning between 4,000 cm$^{-1}$ and 400 cm$^{-1}$ is initially carried out. The pellet is then kept for 12 hours in an environment saturated with ammonia vapours; lastly the IR spectrum is recorded under the same conditions of the initial IR spectrum and the two spectra are elaborated by subtracting to the signals of the spectrum related to the untreated specimen (initial spectrum) the corresponding signals of the specimen spectrum after exposure to ammonia vapours, drawing the "difference" spectrum, normalized by the following equation:

$$\frac{\text{"Difference spectrum"}}{[\text{pellet weight (g)/pellet area (cm}^2)]};$$

the optical densities related to the —COF end groups, reacted with the ammonia vapours, are measured; they with this reactant give detectable peaks of the —COF end groups; the optical densities are converted into mmoles/kg of polymer by using the molar extinction coefficient of the —COF group at 1884 cm$^{-1}$, equal to 215 liters/(moles×cm), as reported in Table 1, page 73 of the report by M. Pianca et Al. "End groups in fluoropolymers", J. Fluorine Chem. 95 (1999), 71-84 (herein incorporated by reference); the found values express the concentrations of the residual polar end groups as mmoles of polar end groups/Kg of polymer: in the spectrum of the thermoprocessable (per)fluorinated polymers no bands related to —COF groups (1900-1830 cm$^{-1}$) are detectable. The sensitivity limit of the above method is 0.05 mmoles/Kg.

Example A

Preparation of $CF_3OCOF$ by Thermal Reaction at 170° C. in glass Reactor

A tubular glass reactor is used, having an inner diameter of 55.6 mm and length of 510 mm, filled with 6×6 glass Raschig rings (free internal volume 842 ml), maintained thermostated by electric resistances.

A gaseous flow of $CF_3OF$ (1.5 liters/hour), synthesized as described in U.S. Pat. No. 4,400,872 and, contemporaneously, a CO flow (1.5 liters/hour), are fed for 5 hours in the reactor, maintained at the temperature of 170° C. The flow coming out from the reactor is continuously analyzed by online gaschromatographic analysis.

The flow coming out from the reactor is condensed, except CO, in a trap maintained at −110° C. containing 15 g of CFC-1=CFCl (A 1112), so that the residual $CF_3OF$ reacts with the olefin to give $CF_3OCFClCF_2Cl$.

After fractional distillation of the resulting mixture, 33.9 g of $CF_3OCOF$ pure at 99.8% (molar yield on the fed $CF_3OF$ 76.5%); 12.3 g of $CF_3OCFClCF_2Cl$; 3.4 g of $COF_2$ are obtained.

The conversion is 84.5% and the selectivity 90%, calculated on the fed $CF_3OF$.

Example B

Preparation of $CF_3OCOF$ by Thermal Reaction at 170° C. in PTFE Reactor

A PTFE tubular thermostated reactor is used, having an internal diameter of 4 mm and length of 13.2 m.

A gaseous flow of $CF_3OF$ (1.5 liters/hour) and, contemporaneously, a flow of CO (2.0 liters/hour) are fed in the reactor, maintained at the temperature of 170° C.

The flow coming out from the reactor, analyzed by gaschromatography, has the following molar composition: 7.3% $CF_3OF$, 54.2% $CF_3OCOF$, 9.1% $COF_2$ and 29.4% CO.

Example C

Preparation of $CF_3OCOF$ by Thermal Reaction at 120° C. in PTFE Reactor

A gaseous flow of $CF_3OF$ (1.5 liters/hour) and, contemporaneously, a flow of CO (2.0 liters/hour) are fed for 6 hours in the same reactor used in the Example B, maintained at the temperature of 120° C. The flow coming out from the reactor is analyzed by gaschromatography and has the following molar composition, leaving out CO in excess: 86.7% $CF_3OF$, 13.3% $CF_3OCOF$.

The flow coming out from the reactor is condensed, except CO, in a trap maintained at −110° C. containing 50 g of A 1112, so that the residual $CF_3OF$ reacts with the olefin.

After fractional distillation of the resulting mixture, 6.8 g of $CF_3OCOF$ having a 99% purity are obtained.

The selectivity is 98%, calculated on the converted $CF_3OF$. The conversion is 13.0%.

Example D

Preparation of $CF_3OCOF$ by Thermal Reaction at 170° C. in AISI 316 Reactor An AISI 316 tubular thermostated reactor is used, having an internal diameter of 4 mm and length of 11.3 m.

A gaseous flow of $CF_3OF$ (1.5 liters/hour) and, contemporaneously, a flow of CO (1.5 liters/hour) are fed for 6 hours in the reactor, maintained at the temperature of 170° C. The gaseous flow coming out from the reactor is condensed in a trap maintained at −110° C. containing 30 g of A 1112.

After fractional distillation of the trap content, 31.2 g of $CF_3OCOF$ pure at 99%, 31.8 g of fluorohalogenether and 3.7 g of $COF_2$ are obtained. The conversion is 66.6% and the selectivity is 86.5%.

Example E

Preparation of $CF_3OCOF$ by Photochemical Reaction 500 g of a perfluoropolyether Galden®LS-165 are fed to a 300 ml cylindrical glass reactor, equipped with stirrer and UV lamp Hanau TQ 150, with 150 W power and optical route 1 cm. Then 2.0 liters/hour of $CF_3OF$ diluted with 3.0 liters/hour of He, and 2.0 liters/hour of CO are fed contemporaneously for 5 hours.

The gases coming out from the reactor are condensed in a trap maintained at −110° C. containing 30 g of A 1112. After fractional distillation of the condensed mixture, 22.9 g of $CF_3OCOF$ pure at 99%, 41.8 g of fluorohalogenether $CF_3OCFClCF_2$—Cl, 5.8 g of $COF_2$, 5.4 g of trifluoromethyl carbonate are obtained.

The $CF_3OF$ conversion is 60.5%. The selectivity is 63.6%.

Example F

Obtainment of MOVE 3 by Reaction of $CF_3OCOF$ with Elemental Fluorine and a Fluoroolefin of Formula CFCl=CFCl and Subsequent Fluorohalogenether Dehalogenation 20 g of CFCl=CFCl (A 1112), 30 g of $CF_3OCOF$ obtained as in the Example A are transferred in a 50 ml glass reactor. The formed solution is maintained at −100° C. and fluorine diluted with nitrogen is bubbled at a flow of 1 liter/hour.

The mass balance at the end of the reaction is 92%, the $^{19}$F-NMR analysis on the reaction raw product (52 g) shows that the fluoroformate conversion is 54% and the selectivity to give the fluorohalogenether $CF_3OCF_2OCFClCF_2Cl$ is 93%. The unreacted fluoroformate is removed from the reaction raw product by adding water, under stirring. It is let reach 25° C., the organic phase is recovered and dried over $MgSO_4$. The mixture is filtered and the obtained residue is distilled and the fraction boiling at 74° C. of 31.8 g corresponding to the fluorohalogenether having 99% purity is recovered.

The fluorohalogenether dehalogenation is carried out by using an 1 liter flask equipped with mechanical stirrer, thermometer, funnel dropping, distillation column and trap at −78° C. 450 ml of dimethylformamide (DMF), 62 g of zinc in powder and 8.3 g of $ZnCl_2$ are fed into the flask. The temperature in the suspension is brought to 80° C. and 150 g of the fluorohalogenether isolated in the previous reaction are added. When the addition is over, the mixture is let react for one hour. At the end the temperature is gradually increased up to 120° C. and it is let react still for one hour. Lastly it is disconnected and 106 g of MOVE 3 $CF_3OCF_2OCF=CF_2$ having 99% purity (boiling point 23° C.) are recovered therefrom.

Example 1

Preparation of the Microemulsion

The microemulsion is obtained by mixing the following ingredients in the amounts indicated hereinafter to prepare one liter of microemulsion:

220.7 ml of a perfluoropolyoxyalkylene having acid end group with average molecular weight 600, of formula:

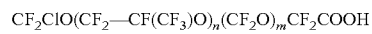

wherein n/m=10;

220.7 ml of an aqueous solution of $NH_3$ at 30% by volume;

427.6 ml of demineralized water;

131 ml of Galden® D02, having average molecular weight 450, of formula:

wherein n/m=20.

Example 2

TFE/MOVE 3 Thermoprocessable Copolymer 3 l of demineralized water and 15 ml of the perfluoropolyoxyalkylene microemulsion prepared in the Example 1 have been introduced, after having made vacuum, in a 5 l (liters) autoclave, equipped with stirrer working at 650 rpm.

The autoclave was then heated to 75° C. and maintained at this temperature for the whole duration of the reaction. 3.0 g of MOVE 3 and subsequently 0.3 bar (0.03 MPa) of ethane are introduced into the autoclave. The pressure inside the reactor is brought to 20 bar (2 MPa) with TFE.

30 ml of a solution of 5 g/l of ammonium persulphate (APS) in water are then introduced into the autoclave.

During the reaction the pressure is maintained at 20 bar by continuously feeding TFE. 1.16 g of MOVE 3 under the form of a liquid are introduced into the reactor every 50 g of fed TFE.

After having fed 500 g of TFE the autoclave was cooled and the latex discharged. The polymerization duration, calculated from the time of the addition of the initiator solution, is 41 min, equal to a productivity of 2.8 g/(liter autoclave⁻.min).

The latex is let decant in a separatory funnel cooled at 5° C. for 24 hours. At the end it is noticed that on the bottom of the separatory funnel no organic phase has been formed. Therefore all the fed monomer has reacted under the adopted conditions.

The latex is then coagulated with nitric acid and dried in a stove at 220° C. for 6 hours.

The obtained polymer has Melt Flow Index (ASTM D 1238-52T) measured at 372° C. with a 5 Kg load, equal to 0.89 g/10 min.

By the IR analysis it results that the content of —COF end groups in the polymer is lower than the sensitivity limit of the above mentioned method (<0.05 mmoles/Kg).

Example 3 (Comparative)

TFE/MOVE 1 Copolymer 3 l of demineralized water and 15 ml of the perfluoropolyoxyalkylene microemulsion prepared in the Example 1 have been introduced, after having made vacuum, in a 5 l (liters) autoclave, equipped with stirrer working at 650 rpm.

The autoclave was then heated to 75° C. and maintained at this temperature for the whole duration of the reaction. 3.5 g of MOVE 1, prepared as described in EP 1,148,072, and subsequently 0.3 bar (0.03 MPa) of ethane are introduced into the autoclave. The pressure inside the reactor is brought to 20 bar (2 MPa) with TFE.

30 ml of a solution of 5 g/l of ammonium persulphate (APS) in water are then introduced into the autoclave.

During the reaction the pressure is maintained at 20 bar by continuously feeding TFE. 1.41 g of MOVE 1 are introduced into the reactor every 50 g of fed TFE.

After having fed 500 g of TFE the autoclave was cooled and the latex discharged.

The polymerization duration, calculated from the time of the addition of the initiator solution, is 59 min, equal to a productivity of 1.8 g/(liter autoclave·min).

The latex is let decant in a separatory funnel cooled at 5° C. for 24 hours. At the end it is noticed that on the bottom of the separatory funnel an organic phase has been formed, that the analysis shows to correspond to the unreacted MOVE 1 monomer. The monomer amount recovered is about equal to 20% of the fed monomer.

The latex is then coagulated with nitric acid and dried in a stove at 220° C. for 6 hours.

The obtained polymer has Melt Flow Index (ASTM D 1238-52T) measured at 372° C. with a 5 Kg load, equal to 1.40 g/10 min.

By the IR analysis it results that the content of —COF end groups in the polymer is equal to 0.15 mmoles/Kg.

Example 4 (Comparative)

TFE/PPVE Copolymer 3 l of demineralized water and 15 ml of the perfluoropolyoxyalkylene microemulsion prepared in the Example 1 have been introduced, after having made vacuum, in a 5 l (liters) autoclave, equipped with stirrer working at 650 rpm.

The autoclave was then heated to 75° C. and maintained at this temperature for the whole duration of the reaction. 9.5 g of PPVE and subsequently 0.17 bar (0.017 MPa) of ethane are introduced into the autoclave. The pressure inside the reactor is brought to 20 bar (2 MPa) with TFE.

30 ml of a solution of 5 g/l of ammonium persulphate (APS) in water are then introduced into the autoclave.

During the reaction the pressure is maintained at 20 bar by continuously feeding TFE. 1.33 g of PPVE are introduced into the reactor every 50 g of fed TFE.

After having fed 500 g of TFE, the autoclave was cooled and the latex discharged.

The polymerization duration, calculated from the time of the addition of the initiator solution, is 89 min, equal to a productivity of 1.2 g/(liter autoclave·min).

The latex is let decant in a separatory funnel cooled at 5° C. for 24 hours. At the end it is noticed that on the bottom of the separatory funnel an organic phase has been formed, that the analysis shows to correspond to the unreacted PPVE monomer. The monomer amount recovered is about equal to 42% of the fed monomer.

The latex is then coagulated with nitric acid and dried in a stove at 220° C. for 6 hours.

The obtained polymer has Melt Flow Index (ASTM D 1238-52T) measured at 372° C. with a load of 5 Kg, equal to 1.60 g/10 min.

By the IR analysis it results that the content of —COF end groups in the polymer is equal to 0.30 mmoles/Kg.

The invention claimed is:

1. TFE-based thermoprocessable copolymers having the following composition, expressed in percentage by moles on the total of the monomers:
   A) from 0.01 to 15% of the monomer of formula:

$$CF_2=CFOCF_2OCF_3 \qquad (a);$$

A1) tetrafluoroethylene from 99.99 to 85%;
   optionally
   B) one or more (per)fluorinated comonomers having at least one unsaturation of ethylene type, different from TFE;
   wherein when B) is present, the sum of the molar percentages of A1)+B) is within the limits above mentioned for A1), and the sum of the molar percentages A) +B) is such that the copolymers show at least one melting peak when analyzed by DSC analysis.

2. TFE-based thermoprocessable copolymers according to claim 1, wherein the sum of A)+B), expressed in per cent by moles of the total moles of the comonomers is equal to or lower than 14%.

3. TFE-based thermoprocessable copolymers according to claim 1, wherein comonomers B) are selected from the following:
   $C_3$-$C_8$ perfluoroolefins;
   (per)fluoroalkylvinylethers of formula $CF_2=CFOR_f$, wherein $R_f$ is a $C_1$-$C_2$ (per)fluoroalkyl.

4. TFE-based thermoprocessable copolymers according to claim 3, wherein the comonomers are HFP and/or perfluoromethylvinylether.

5. Compositions comprising:
   perfluoropolymers according to claim 1;
   and
   perfluoropolymers obtainable from polymers containing a —COF end group amount higher than 0.05 mmoles/Kg of polymer;
   the perfluoropolymer amount of the present invention being at least 5-10% by weight, preferably 20-40% by weight, more preferably 50% by weight, with respect to the total weight of the perfluoropolymers in the composition.

6. Compositions according to claim 5, wherein the perfluoropolymers containing —COF end groups in an amount higher than 0.05 mmoles/Kg of polymer comprise comonomers selected from the following:

perfluorodioxole having the following formula:

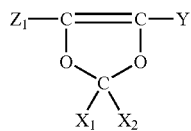

(2)

wherein
- Y = F, $ORf_1$, $Rf_1$ being a $C_1$-$C_5$ perfluoroalkyl;
- $X_1$ and $X_2$, equal to or different from each other, are selected between F and $CF_3$;
- $Z_1$ is selected between F, Cl;

perfluoroalkylvinylethers of formula $CF_2$=CFORf wherein Rf is a $C_3$ perfluoroalkyl;

$CF_2$=CFOXa perfluorooxyalkylvinylethers, wherein Xa is $C_3$-$C_{12}$ perfluorooxyalkyl having one or more ether groups;

perfluorovinylethers (MOVE) of general formula $CFX_{A1}$=$CX_{A1}OCF_2OR_{A1}$ (A-1) wherein $R_{A1}$ is a $C_2$-$C_6$ linear, branched or $C_5$-$C_6$ cyclic perfluoroalkyl group, or a $C_2$-$C_6$ linear or branched when possible perfluoro oxy-alkyl group containing from one to three oxygen atoms; $X_{A1}$=F.

7. Manufactured articles comprising the copolymers according to claim 1.

8. A method for making manufactured articles for use up to temperatures of 275°0 C., comprising using the TFE-based thermoprocessable copolymers of claim 1.

9. The TFE-based thermoprocessable copolymers of claim 1, wherein the percentage by moles of the monomer of formula (a) is 0.05 to 13%.

10. The TFE-based thermoprocessable copolymers of claim 1, wherein the percentage by moles of the monomer of formula (a) is 0.1 to 9%.

11. The TFE-based thermoprocessable copolymers of claim 1, wherein the percentage by moles of tetrafluoroethylene is 99.95 to 87%.

12. The TFE-based thermoprocessable copolymers of claim 1, wherein the percentage by moles of tetrafluoroethylene is 99.9 to 91 %.

13. The TFE-based thermoprocessable copolymers of claim 2 wherein the sum of A) and B), expressed in percent by moles of the total moles of the comonomers is less than or equal to 10%.

14. The TFE-based thermoprocessable copolymers of claim 3 wherein the $C_3$-$C_8$ perfluoroolefin is hexafluoropropene.

15. The TFE-based thermoprocessable copolymers of claim 3 wherein the $C_1$-$C_2$ (per)fluoroalkyl is $CF_3$.

* * * * *